US008926914B2

(12) United States Patent
Seok et al.

(10) Patent No.: US 8,926,914 B2
(45) Date of Patent: Jan. 6, 2015

(54) LIQUID MEDIUM PLASMA DISCHARGE GENERATING APPARATUS

(75) Inventors: Dong Chan Seok, Daejeon-si (KR); Tai Hyeop Loh, Daejeon-si (KR); Seung Ryul Yoo, Daejeon-si (KR); Yong Cheol Hong, Daejeon-si (KR); Bong Ju Lee, Daejeon-si (KR)

(73) Assignee: Korea Basic Science Institute, Daejeon-Si (KR)

( * ) Notice: Subject to any disclaimer, the term of this patent is extended or adjusted under 35 U.S.C. 154(b) by 399 days.

(21) Appl. No.: 13/393,755

(22) PCT Filed: Jul. 21, 2010

(86) PCT No.: PCT/KR2010/004789
§ 371 (c)(1), (2), (4) Date: Mar. 1, 2012

(87) PCT Pub. No.: WO2011/027973
PCT Pub. Date: Mar. 10, 2011

(65) Prior Publication Data

US 2012/0160692 A1 Jun. 28, 2012

(30) Foreign Application Priority Data

Sep. 2, 2009 (KR) ........................ 10-2009-0082710
Nov. 30, 2009 (KR) ........................ 10-2009-0117396

(51) Int. Cl.
*B01J 19/08* (2006.01)

(52) U.S. Cl.
USPC .................................................... 422/186.04

(58) Field of Classification Search
USPC .................................................... 422/186.04
See application file for complete search history.

(56) References Cited

U.S. PATENT DOCUMENTS 3,099,615 A * 7/1963 Kollsman ...................... 204/520
3,271,292 A * 9/1966 Kollsman ...................... 204/637
2003/0101936 A1 6/2003 Lee
2006/0260931 A1* 11/2006 Sano ........................ 204/196.08

FOREIGN PATENT DOCUMENTS

JP 2000093972 A 4/2000
JP 2001017980 A 1/2001
JP 2004-152523 5/2004
KR 10-2003-0045435 6/2003
KR 10-2007-0085750 8/2007

OTHER PUBLICATIONS

Singapore Written Opinion for 201201564-0 dated Dec. 19, 2012.
International Search Report mailed Feb. 23, 2011 for PCT/KR2010/004789.
Japanese Office Action dated Feb. 4, 2014.

* cited by examiner

*Primary Examiner* — Kishor Mayekar
(74) *Attorney, Agent, or Firm* — Lowe Hauptman & Ham, LLP

(57) ABSTRACT

A liquid medium plasma discharge generating apparatus includes a main body; a power electrode, provided at one side within the main body, for receiving electric power; a diaphragm member provided within the main body, and consisting of a dielectric defining one or more holes or slits; and a liquid medium charged inside the main body, wherein a ground electrode may be further provided in the main body, opposite the power electrode with the diaphragm member therebetween, whereupon the diaphragm member is arranged contacting the ground electrode.

20 Claims, 16 Drawing Sheets

(a)

(b)

Fig. 17

Moving velocity of ions (Water 25°C)

| Ion | u ($m^2 s^{-1} V^{-1}$) |
|---|---|
| Cations | |
| $H^+$ | $36.23 \times 10^{-8}$ |
| $Na^+$ | $5.19 \times 10^{-8}$ |
| $K^+$ | $7.62 \times 10^{-8}$ |
| $Zn^{2+}$ | $5.47 \times 10^{-8}$ |
| Anions | |
| $OH^-$ | $20.64 \times 10^{-8}$ |
| $Cl^-$ | $7.91 \times 10^{-8}$ |
| $Br^-$ | $8.09 \times 10^{-8}$ |
| $SO_4^{2-}$ | $8.29 \times 10^{-8}$ |

LIQUID MEDIUM PLASMA DISCHARGE GENERATING APPARATUS

CROSS REFERENCE TO RELATED APPLICATION

This application claims the priority of Korean Patent Application No. 10-2009-0082710, filed on Sep. 2, 2009; and Korean Patent Application No. 10-2009-0117396, filed on Nov. 30, 2009 in the KIPO (Korean Intellectual Property Office). Further, this application is the National Phase application of International Application No. PCT/KR2010/004789, filed on Jul. 21, 2010, which designates the United States and was published in Korean.

TECHNICAL FIELD

The present invention relates to a liquid medium plasma discharge apparatus, and more particularly, to a liquid medium plasma discharge apparatus which includes a power electrode provided at one side within a main body that is filled with a liquid medium, and a dielectric diaphragm member which is provided in the main body, and which has at least one hole or slit, thereby providing a microtube liquid medium plasma discharge apparatus, capable of applying a high electric field even with low wattage by minimizing conduction current.

BACKGROUND ART

Generally, a plasma generating electrode is used in waste or drinkable water treatment, such as sterilization of microorganisms, removal of organic or inorganic contaminants, e.g. Volatile Organic Compounds (VOCs), or the like, or is used as a underwater sound generating source.

FIG. 1 is view showing a conventional plasma discharge apparatus used in a common liquid medium. The conventional plasma discharge apparatus includes: a main body 1 that is filled with liquid (a liquid medium); a flat ground electrode 2 which is provided at one side within the main body; a needle or rod type power electrode 3 which is disposed in the main body opposite the ground electrode 2; and a high voltage power supply device 4 which serves to supply electric power to the power electrode 3. The power electrode 3 is coated with an insulating material 5. A dotted circle in FIG. 1 is the region where corona discharge, sparks, or arc discharge occurs.

However, such a plasma discharge apparatus has problems of being difficult to be made larger, of reduced efficiency, and of being difficult to obtain a permanently-operable power supply device. In addition, the plasma discharge apparatus also has limitations of short life of an electrode and of lower adaptability that it can only be applied to the liquid medium (e.g. ultra pure water) having very low conductivity.

FIG. 2 is a view explaining the liquid medium plasma generating wattage when using the conventional electrode structure. The liquid medium plasma generating wattage of the plasma discharge apparatus having the conventional electrode structure will now be described with respect to FIG. 2.

A simple equation for obtaining the plasma generating wattage is as follows:

$$\text{Electric field strength } E=V/d$$

Here, V is voltage, and d is a length of conductive volume.

$$V=I\times R$$

Here, I is conduction current, and R is resistance across electrodes.

$$I=V/R$$

$$R=d/A\times S$$

Here, A is a cross-sectional area of conductive volume, and A is electric conductivity of a liquid medium.

$$\text{Wattage } W=V\times I$$

Assuming that the liquid medium is super pure water, the length (d) of the conductive volume is 1 cm, the cross-sectional area (A) of the conductive volume is 2×2=4 $cm^2$, and the conductivity of the ultra pure water is $50\times10^{-6}$ (S/cm), the conductive resistance (R=d/A×S) becomes $1/(50\times10^{-6}\times4)$ =5000 (Ω). Here, if the electric field strength E for generating plasma discharge in the ultra pure water equals 5 kV/cm, required voltage (V=E×d) becomes 5 kV/cm×1 cm=5 kV. However, if electric conduction occurs through ultra pure water, conduction current (I) equals 5000 (V)/5000 (Ω)=1 (A), and the wattage (W) equals 5000 (V)×1 (A)=5 (kW).

Next, assuming that the liquid medium is sea water, the length (d) of the conductive volume is 1 cm, the cross-sectional area (A) of the conductive volume is 2×2=4 $cm^2$, and the conductivity of the sea water is $53\times10^{-3}$ (S/cm), the conductive resistance (R=d/A×S) becomes $1/(53\times10^{-3}\times4)$=4.7 (Ω). Here, if the electric field strength E for generating plasma discharge in the sea water equals 5 kV/cm, required voltage becomes 5 kV. However, if electric conduction occurs through sea water, conduction current (I=V/R) equals 5000 (V)/4.7 (Ω)=1064 (A), and the wattage (W=V×I) equals 5000 (V)×1064 (A)=5.3 (MW), which corresponds to total wattage consumed by a small city. However, such a power supply device does not exist, nor is impossible to realize even using a pulse. Thus, using such an electrode structure cannot generate plasma discharge through the sea water.

DISCLOSURE

Technical Problem

Accordingly, the present invention has been made keeping in mind the above problems occurring in the related art, and is intended to provide a microtube liquid medium plasma discharge apparatus in which a liquid medium fills a gap between a power electrode and a ground electrode with a dielectric diaphragm member having one or more holes or slits disposed in the middle of the gap, causing conduction current to be minimized, thereby making it possible to apply a high electric field even with low wattage.

Technical Solution

In an aspect, the present invention provides a liquid medium plasma discharge apparatus including: a main body filled with a liquid medium; a power electrode provided at one side within the main body to receive electric power; and a dielectric diaphragm member provided in the main body and composed of a dielectric having at least one hole or slit.

In the liquid medium plasma discharge apparatus, the diaphragm member may be disposed in contact with the power electrode, or otherwise may be disposed at a distance from the power electrode.

In another aspect, the present invention provides a liquid medium plasma discharge apparatus including: a main body filled with a liquid medium; a power electrode provided at one side within the main body to receive electric power; a dielectric diaphragm member provided in the main body and composed of a dielectric having at least one hole or slit; and a ground electrode provided in the main body opposite the power electrode with the diaphragm member interposed therebetween, wherein the diaphragm member is disposed in contact with the ground electrode.

In the liquid medium plasma discharge apparatus, the diaphragm member may have the dielectric constant smaller than that of the liquid medium.

In the liquid medium plasma discharge apparatus, the strength of the electric field may increase as the dielectric constant of the diaphragm member decreases.

Advantageous Effects

As described above, the liquid medium plasma discharge apparatus has the effects of being easy to fabricate, and of an electrode being resistant to corrosion, being cost-effective.

Further, the present invention also has the effects of being adaptable to any of application fields irrespective of electric conductivity of the liquid medium, and minimizing the processing cost needed for such as an existing plating process, because of less wattage.

DESCRIPTION OF DRAWINGS

FIGS. 6 to 8 are views showing the test results of physical quantities of the liquid medium plasma discharge electrode in which a single microtube is provided in the dielectric diaphragm member, wherein FIG. 6 is a graphical diagram showing the relationship between the electric potential and field lines, FIG. 7 is a graphical diagram showing the distribution of electric field in a liquid medium, and FIG. 8 is a graphical diagram showing the distribution of the electric field in a hole of the diaphragm member.

FIGS. 9 to 11 are views showing the test results of physical quantities of the liquid medium plasma discharge electrode in which two microtubes are provided in the dielectric diaphragm member, wherein FIG. 9 is a graphical diagram showing the relationship between the electric potential and field lines, FIG. 10 is a graphical diagram showing the distribution of electric field in a liquid medium, and FIG. 11 is a graphical diagram showing the distribution of the electric field in a hole of the diaphragm member.

FIGS. 12 to 14 are views of a microtube liquid medium plasma discharge apparatus for test, wherein FIG. 12 shows the appearance of the plasma discharge apparatus, FIG. 13 shows the internal structure of the plasma discharge apparatus, and FIG. 14 shows the cross-sectional shape of the plasma discharge apparatus.

FIG. 17 is a table containing a data of moving velocity of ions.

MODE FOR INVENTION

Figure 1:
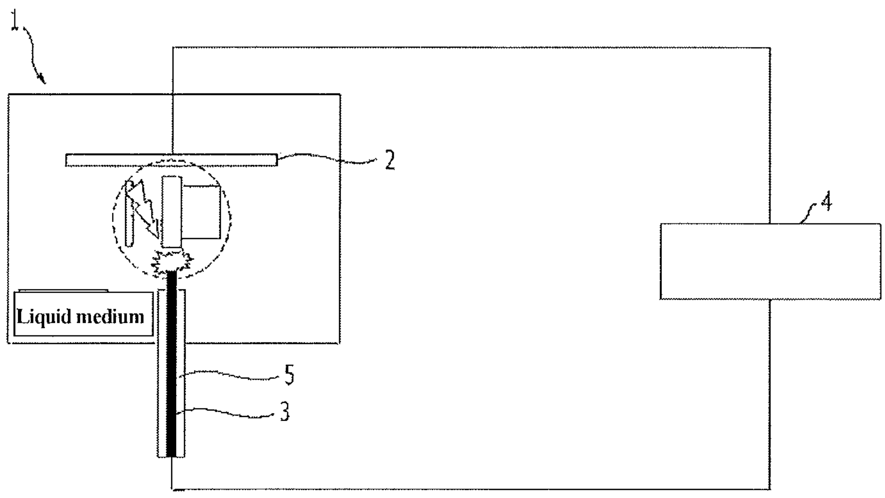
FIG. 1 is a view showing a conventional liquid medium plasma discharge apparatus.
Figure 2:
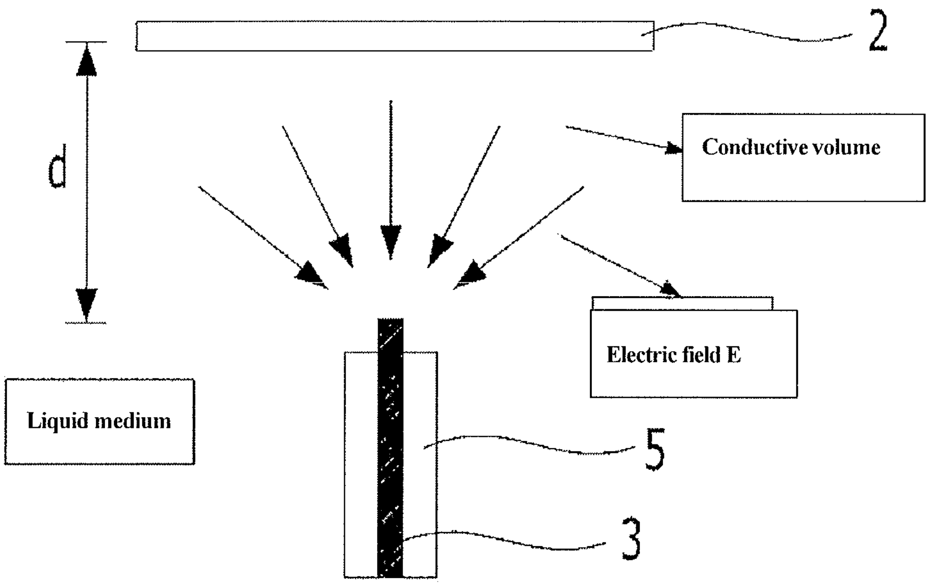
FIG. 2 is a view explaining the liquid medium plasma generating wattage of a conventional electrode structure.

The particular structure or the functional explanation is suggested only for the purpose of explaining the embodiment depending on the concept of present invention and the embodiments according to the concept of present invention can be performed in various patterns and it shall not be interpreted to be limited to the embodiments explained in this specification or the application.

The particular embodiments are listed as examples on the drawing and they are explained in this specification and application in detail because the diversified modifications can be made on the embodiments for the concept of present invention and they can take in various patterns. However, the embodiments for the concept of present invention are not to be limited to a certain disclosure pattern and it shall be understood to include every change, equivalencies and the alternatives which are included in the range of the idea and technology of present invention.

The terminologies of the $1^{st}$ and/or the $2^{nd}$ can be used to explain many constituent elements, but the above constituent elements are not limited to the above terminologies. The above terminologies can be named only for telling one constituent element from the other constituent elements. For example, the $1^{st}$ constituent element can be named as the $2^{nd}$ constituent elements without deviating from the range of the right according to the concept of the invention, and similarly, the $2^{nd}$ constituent element can be named as the $1^{st}$ constituent element.

When a certain constituent element is “connected” or “contacted” to another constituent element, it can be connected or contacted to another constituent element, but it shall be understood that there might be another constituent element in the middle. On the other hand, when a certain constituent element is “directly connected” or “directly contacted” to another constituent element, it shall be understood that there must be no existence of another constituent element in the middle. The other expressions to explain the relation among the constituent elements, i.e. “~ in between”, “just ~ in between” or “adjacent to ~” and “directly adjacent to ~” shall be understood in the same The terminology used herein is for the purpose of describing particular embodiments only and is not intended to limit the invention. As used herein, the singular forms are intended to include the plural forms as well, unless the context clearly indicates otherwise. It will be further understood that the terms “comprises” and/or “comprising,” or “includes” and/or “including,” when used in this specification, specify the presence of stated features, regions, integers, steps, operations, elements and/or components, but do not preclude the presence or addition of one or more other features, regions, integers, steps, operations, elements, components and/or groups thereof.

The every terminology used herein including the technical and scientific terminologies has the same meaning with the general understanding by the person with general knowledge in the technical part where present invention is categorized unless otherwise defined. The terminologies defined in the dictionary which are used generally shall be interpreted as to have the same meaning with context of the related technology and it shall not be interpreted as ideal or excessively formative meaning unless otherwise clearly defined herein.

The details of present invention can be explained by explaining the desirable embodiment of present invention by referring the attached drawing. The same marks for the reference suggested on each drawing means the same sub material.

Figure 3:
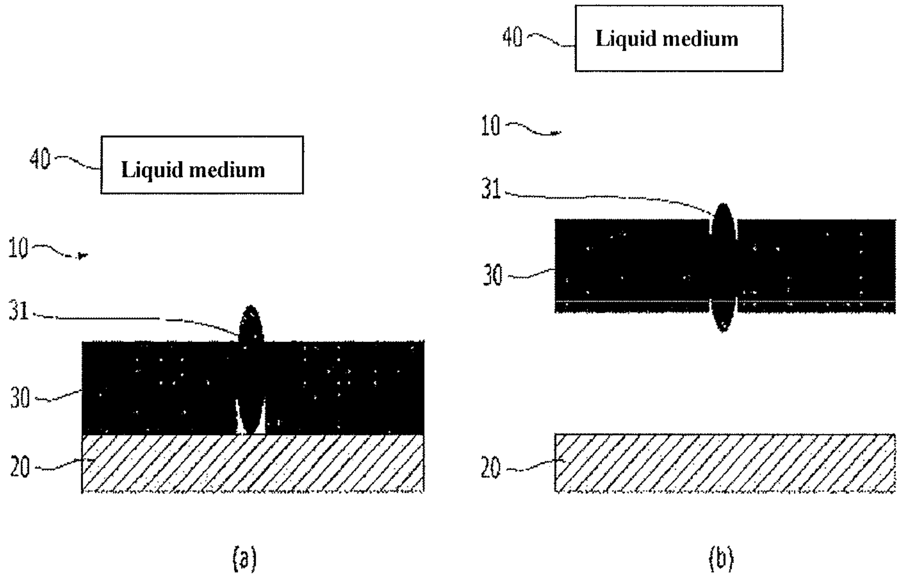
FIG. 3 is a view showing a microtube liquid medium plasma discharge apparatus according to the present invention, wherein FIG. 3 (*a*) shows the construction in which a dielectric diaphragm member is disposed in contact with a power electrode, and FIG. 3 (*b*) shows the construction in which the dielectric diaphragm member is disposed at a distance from the power electrode.

FIG. 3 is a view showing a microtube liquid medium plasma discharge apparatus according to the present invention, wherein FIG. 3 (*a*) shows the construction in which a dielectric diaphragm member 30 is disposed in contact with a power electrode 20, and FIG. 3 (*b*) shows the construction in which the dielectric diaphragm member 30 is disposed at a distance from the power electrode 20.

The microtube liquid medium plasma discharge apparatus includes a main body 10 which is filled with a liquid medium, a power electrode 20 which is provided at one side within the main body to receive electric power, and a dielectric diaphragm member 30 which is provided in the main body and which is composed of a dielectric having at least one hole or slit. The power electrode 20 is supplied with electric power from a power supply device (not shown). As shown in FIG. 3 (*a*), the diaphragm member 30 may be disposed in contact with the power electrode 20, or otherwise may be disposed at a distance from the power electrode 20.

Figure 4:
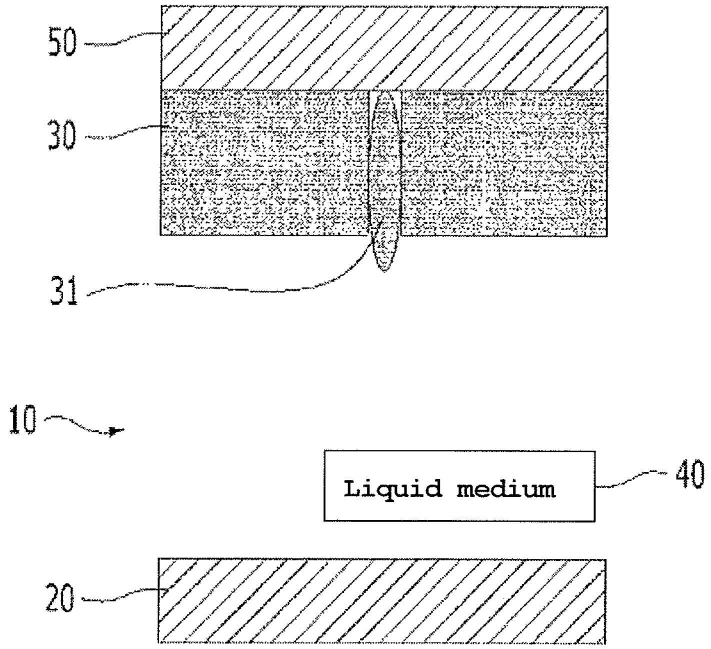
FIG. 4 is a view showing a variant of the microtube liquid medium plasma discharge apparatus.

In another aspect, FIG. 4 is a view showing a variant of the microtube liquid medium plasma discharge apparatus. As shown in FIG. 4, the liquid medium plasma discharge apparatus includes a main body 10 which is filled with a liquid medium, a power electrode 20 which is provided at one side within the main body to receive electric power, a dielectric diaphragm member 30 which is provided in the main body and which is composed of a dielectric having at least one hole or slit, and a ground electrode 50 which is provided in the main body opposite the power electrode with the diaphragm member interposed therebetween. Here, the diaphragm member 30 is disposed in contact with the ground electrode 50. That is, the plasma discharge apparatus shown in FIG. 4 further includes the ground electrode 50 that is provided in the main body opposite the power electrode 20, with the diaphragm member 30 interposed therebetween, in such a manner as to be contact with the ground electrode 50.

Figure 5:
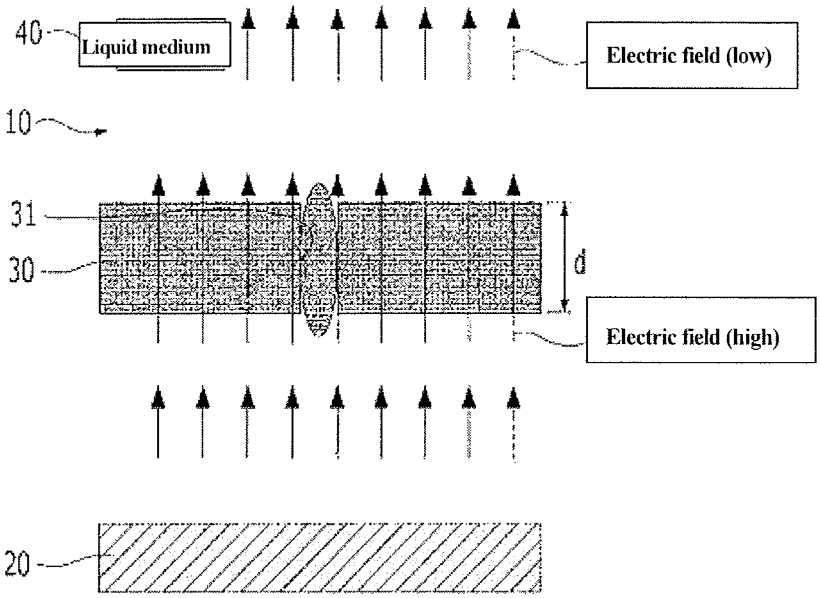
FIG. 5 is a view explaining the wattage for generating plasma in a liquid medium when using the electrode structure of the liquid medium plasma discharge apparatus.

In the embodiment and variant thereof, the electric field around the hole or slit 31 of the diaphragm member 30 is the same as in the diaphragm member 30, and a quantity of conduction current that depends on the conductivity of a liquid medium is proportional to a cross-section area of the hole or slit 31, and is inverse proportion to the length d thereof (see FIG. 5).

In addition, the dielectric constant of most of polar liquid mediums is much higher than that of the dielectric diaphragm member 30, so that the strength of the electric field in the hole or slit 31 can be maximized. That is, the dielectric constant of the dielectric diaphragm member 30 is smaller than that of the liquid medium 40.

Thus, the quantity of the conduction current is minimized so that a high electric field can be applied even with low wattage. This makes it easy to fabricate the plasma discharge apparatus and enables the electrodes 20 and 50 to be resistant to corrosion so that it needs not to use expensive electrodes. In addition, the plasma discharge apparatus can be applied to diverse fields of application irrespective of conductivity of a liquid medium, minimize the process cost for e.g. an existing plating process because of having very low wattage, and easily obtain a permanently operable power supply device.

FIG. 5 is a view explaining the wattage for generating plasma in a liquid medium when using the electrode structure (FIG. 3 (*b*)) of the liquid medium plasma discharge apparatus.

The wattage for generating plasma in a liquid medium can be obtained by following equations.

Electric field strength $E=V/d$

Here, V is voltage, and d is a length of conductive volume.

$V=I\times R$

Here, I is conduction current, and R is resistance across electrodes.

$I=V/R$ $R=d/A\times S$

Here, A is a cross-sectional area of conductive volume, and A is electric conductivity of a liquid medium.

Wattage $W=V\times I$

Thus, the wattage for generating plasma discharge in a liquid medium in the structure of the plasma discharge electrode can be obtained by the above equations.

A test condition is such that the liquid medium is the sea water, the length (d) of the conductive volume is 1 cm, an area of the hole 31 of the dielectric diaphragm member 30 is $0.1\times0.1=0.01$ cm$^2$, and the conductivity of the sea water is $53\times10^{-3}$ (S/cm).

The conductive resistance (R=d/A×S) becomes $1/(53\times10^{-3}\times0.01)=1887$ (Ω). Here, if the electric field strength E for generating plasma discharge in the sea water equals 5 kV/cm, required voltage (V=E×d) becomes 5 kV/cm×1 cm=5 kV.

Electric conduction occurs through the sea water, and conduction current (I=V/R) equals 5000 (V)/1887 (Ω)=2.65 (A) so that the wattage (W=V×I) equals 5000 (V)×2.65 (A)=13.2 (kW). Here, if a pulse voltage is used, the plasma discharge can be effectively maintained.

Here, since a maximum moving velocity of ions in an electrolyte is limited, ohmic current is hard to flow without plasma discharge through a narrow fluid passage (hole or slit). Thus, the wattage that is actually required is much smaller than 13.2 kW.

Figure 6:
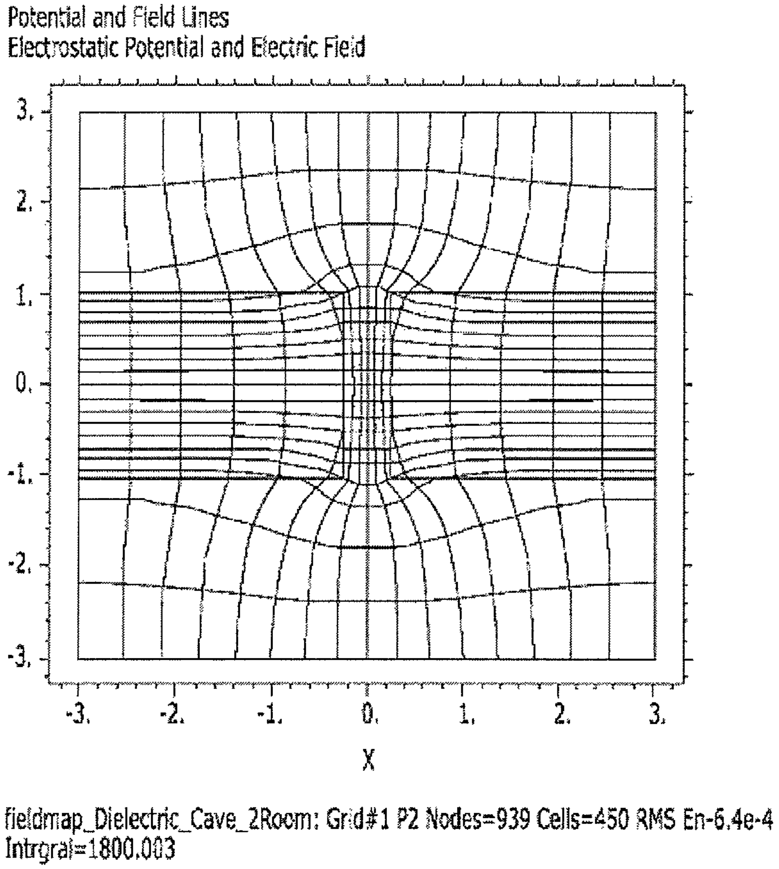
Figure 7:
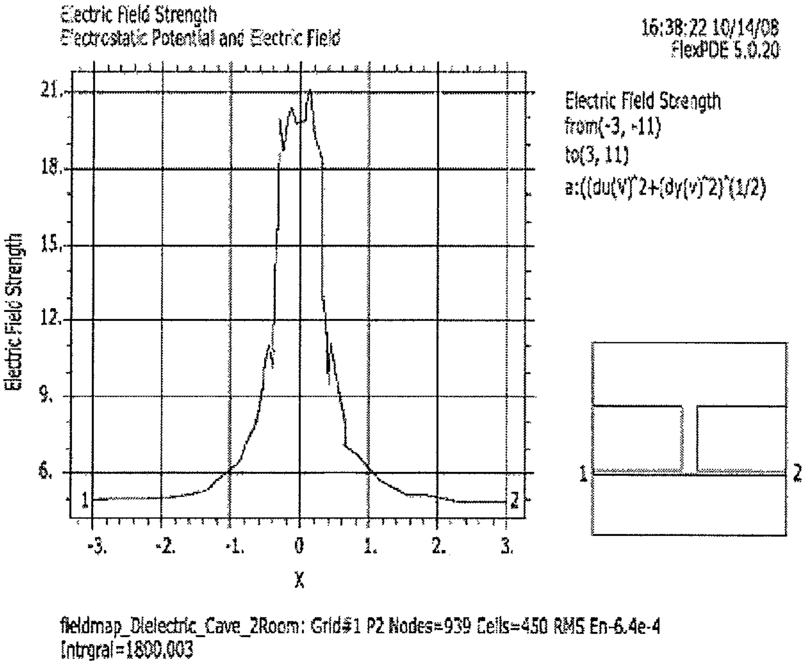
Figure 8:
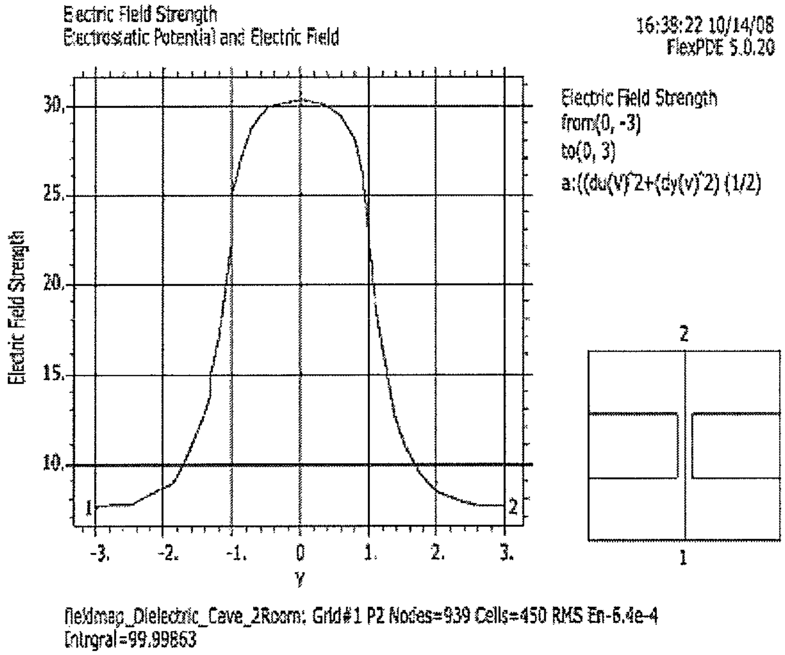
Figure 9:
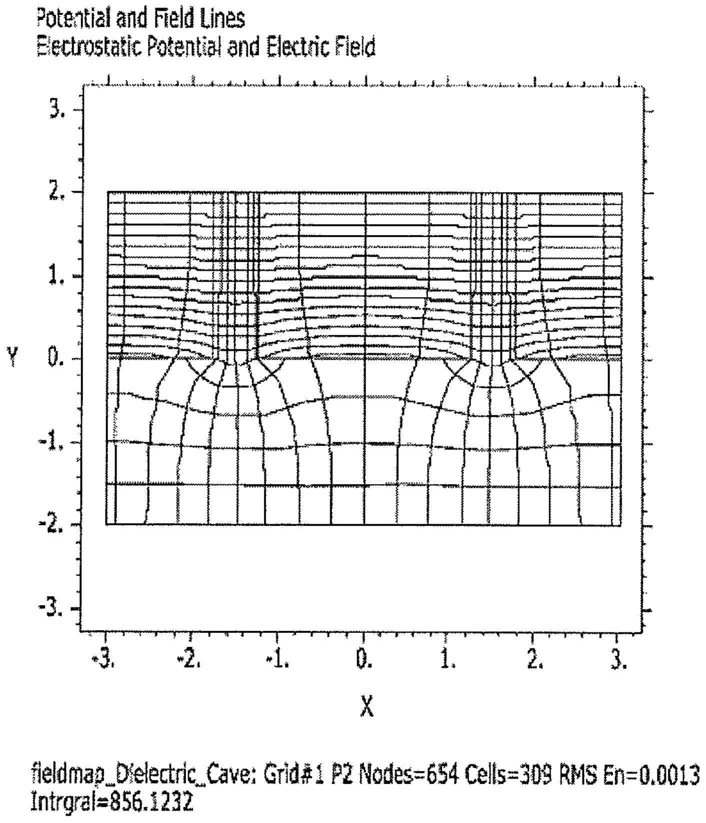
Figure 10:
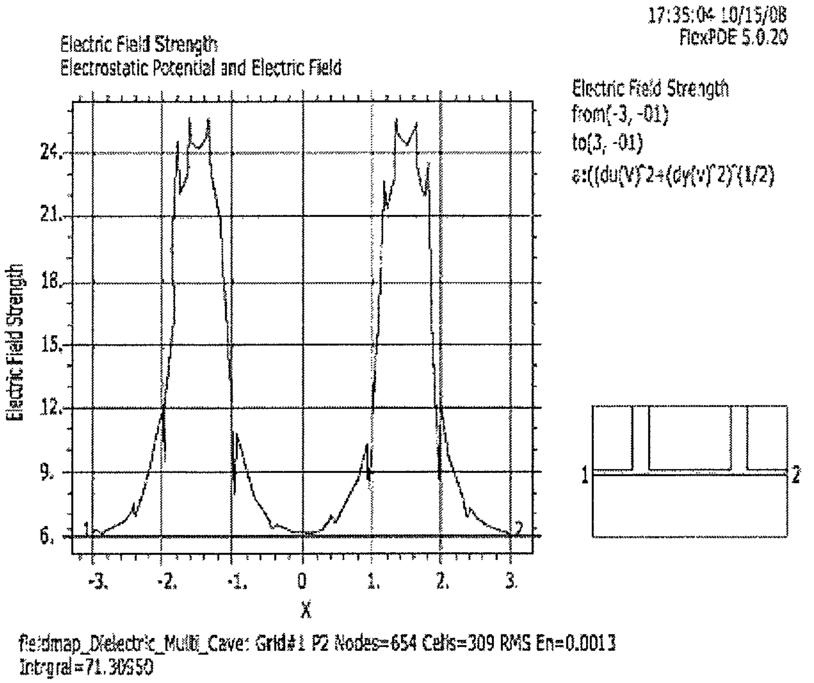
Figure 11:
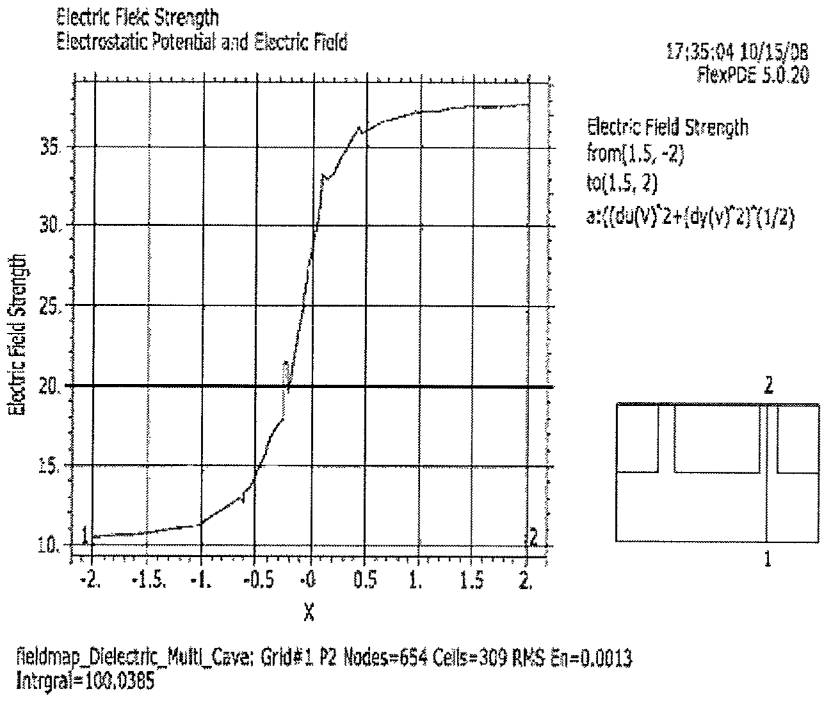

FIGS. 6 to 8 are views showing the test results of physical quantities of the liquid medium plasma discharge electrode in which a single microtube 31 is provided in the dielectric diaphragm member 30. FIGS. 9 to 11 are views showing the test results of physical quantities of the liquid medium plasma discharge electrode in which two microtubes 31 are provided in the dielectric diaphragm member 30. Here, FIGS. 6 and 9 are graphical diagrams showing the relationship between the electric potential and field lines, FIGS. 7 and 10 are graphical diagrams showing the distribution of electric field in a liquid medium, and FIGS. 8 and 11 are graphical diagrams showing the distribution of the electric field in a hole of the diaphragm member, wherein vertical axes thereof indicate the strength of electric field, and horizontal axes thereof indicate the position of line extending from 1 to 2 in the microtube which is shown in the right, lower section of the figures.

Figure 12:
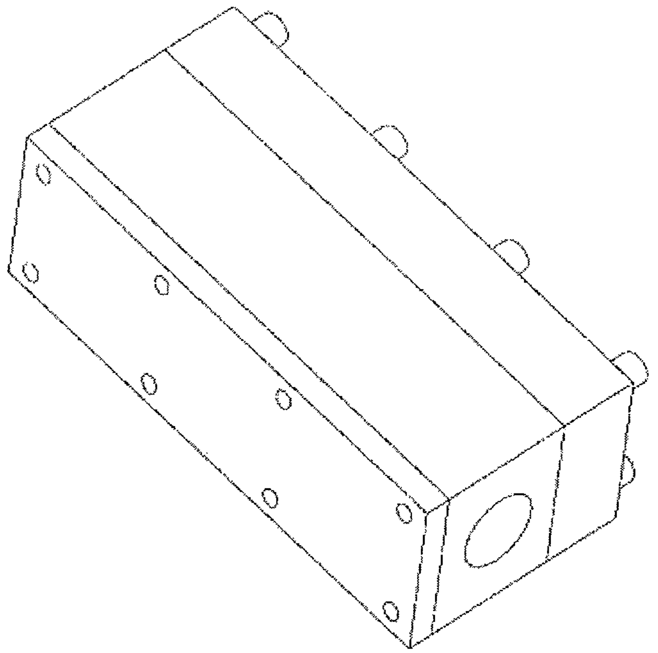
Figure 13:
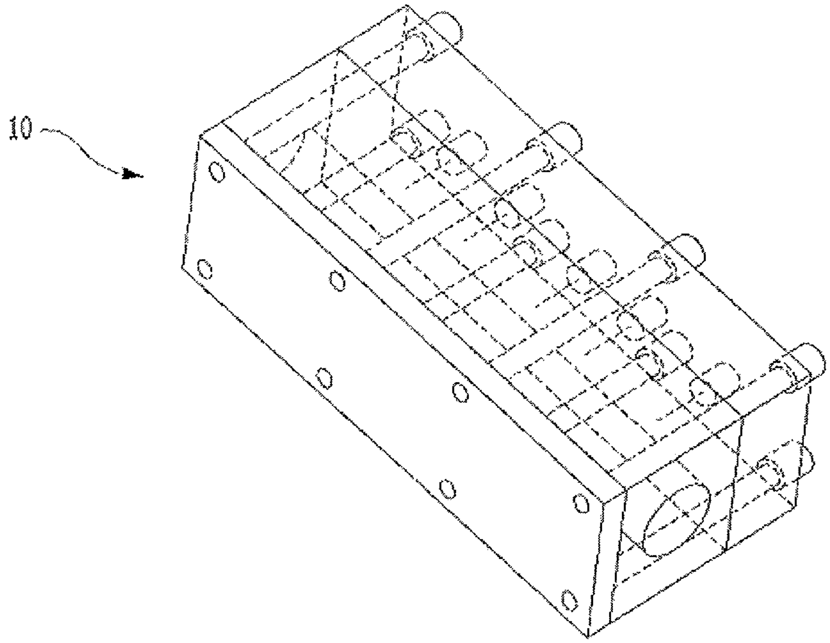
Figure 14:
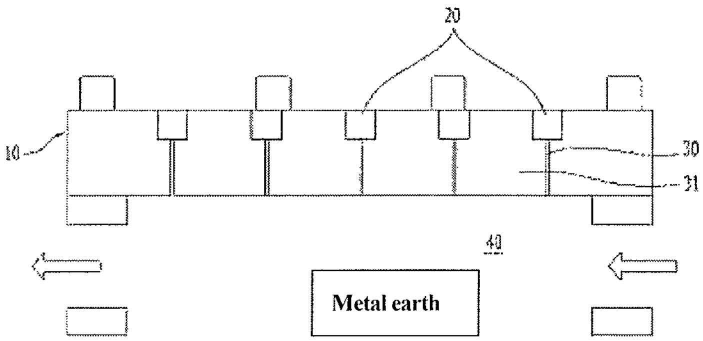

FIGS. 12 to 14 are views of a microtube liquid medium plasma discharge apparatus for test, wherein FIG. 12 shows the appearance of the plasma discharge apparatus, FIG. 13 shows the internal structure of the plasma discharge apparatus, and FIG. 14 shows the cross-sectional shape of the plasma discharge apparatus.

In FIGS. 12 to 14, it is expected that a device characteristic of a reactor is such that resistance is up to 1.92 kΩ, and capacitance is up to 2 pF. It is also expected that a desired power supply device is such that an output voltage is up to 10 kV, a waveform is + or bipolar square wave, a duty cycle is up to 50 usec, Rep f is up to 2 kHz, a current peak is up to 5.2 A, and the power range is up to 5.2 kW. For reference, a moving velocity of ions at 10 kV is such that a hydrogen ion ($H^+$) is 36.3 cm/sec, a hydroxyl ion ($OH^-$) is 20.7 cm/sec, a sodium ion ($Na^+$) is 5.2 cm/sec, and a chlorine ion ($Cl^-$) is 7.9 cm/sec.

Figure 15:
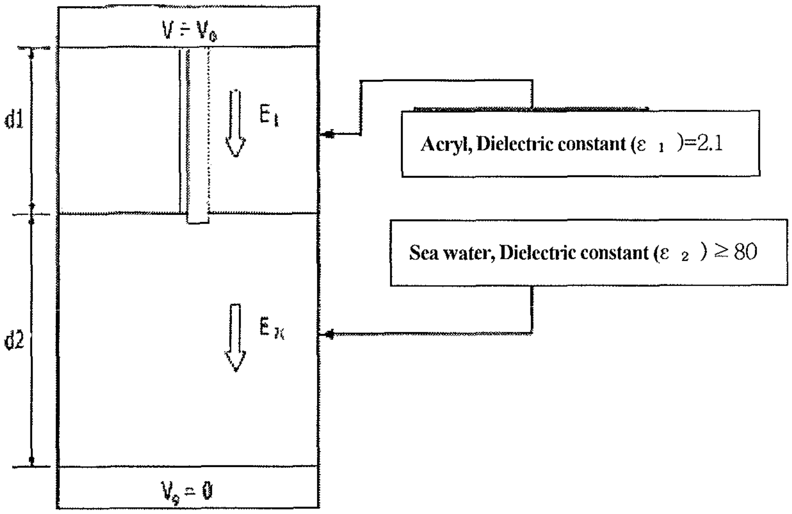
FIG. 15 is a view showing the basic principle of a discharge mechanism of the plasma discharge apparatus for test shown in FIGS. 12 to 14.

Generally, the dielectric constant of a polar solvent including an aqueous solution is greater than that of a solid dielectric. For example, the dielectric constant is such that distilled water is 80, ethylene carbonate is 89.6, propylene carbonate is 64, alumina ceramic is 10, glass is 5, and acryl is 2.1. In FIG. 15, when the dielectric diaphragm member is composed of acryl, the dielectric constant ($\in_1$) is 2.1, and when the liquid medium is sea water, the dielectric constant ($\in_2$) is 80 or more.

The strength E of electric field at the microtude 31 of the dielectric diaphragm member 30 in the liquid medium can be obtained by the following equations.

$$|\vec{E_1}| = \frac{V_0 \cdot \varepsilon_2}{d_1 \cdot \varepsilon_2 + d_2 \cdot \varepsilon_1}$$

$$|\vec{E_1}| : |\vec{E_2}| = \varepsilon_2 : \varepsilon_1$$

Here, $E_1$ is the strength of electric field at the microtube of the dielectric diaphragm member, and $E_2$ is the strength of electric field in the liquid medium. $d_1$ is a length of the microtube of the dielectric diaphragm member, and $d_2$ is a length of the liquid medium conductive volume. $\in_1$ is the dielectric constant of the dielectric diaphragm member, and $\in_2$ is the dielectric constant of the liquid medium.

As can be seen from the above equations, the electric field at the microtube surrounded by the solid dielectric can be intensified by the influence of the electric field at the surrounding solid dielectric. Thus, at a given voltage condition, the lower the dielectric constant of the solid dielectric is, the higher the electric field can be applied to the microtube.

According to the above equations, while thinner thickness of the solid dielectric causes the higher electric field to be applied to the microtube, if the thickness is much thinner, electric resistance of the microtube decreases so that electrolytic conduction occurs without the plasma being generated, possibly causing power loss to increase.

The conductivity (S) of sea water is 53 mS/cm, and specific resistance (Rs) of sea water is 18.9 Ωcm. Conduction resistance Rh at the hole of the dielectric diaphragm member is 9.6 kΩ.

Figure 16:
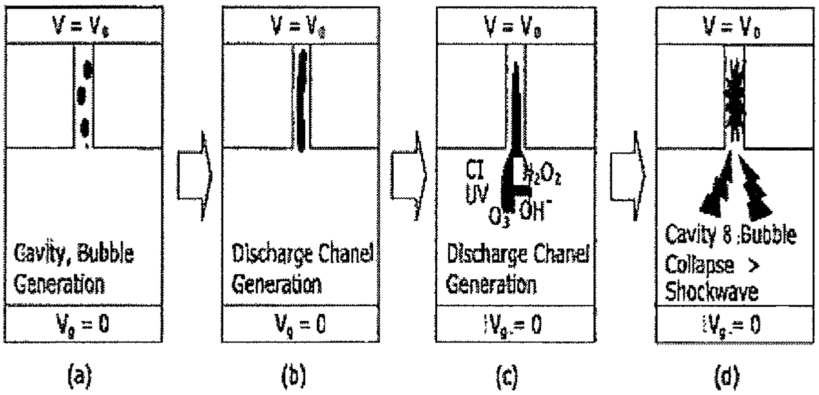
FIG. 16 is a flow chart of the discharge mechanism of the plasma discharge apparatus for test.

FIG. 15 is a view showing the basic principle of a discharge mechanism of the plasma discharge apparatus for test shown in FIGS. 12 to 14, and FIG. 16 is a flow chart of the discharge mechanism of the plasma discharge apparatus for test, wherein FIG. 16 (*a*) shows cavities or bubbles being generated in the hole or slit of the dielectric diaphragm member, FIG. 16 (*b*) shows a discharge channel being generated in the hole or slit, FIG. 16 (*c*) shows radicals, ultraviolet rays, and chemicals being emitted, and FIG. 16 (*d*) shows shockwaves being generated while the cavity or bubbles collapse.

FIG. 17 is a table containing a data of moving velocity of ions.

As such, the electric field at the hole or slit of the dielectric diaphragm member is the same as in the dielectric diaphragm member, and a quantity of conduction current that depends on the conductivity of the liquid medium is in proportion to the cross-sectional area of the hole or slit, but in inverse proportion to the length of the hole or slit. The dielectric constant of most of polar liquid mediums is much higher than that of the dielectric diaphragm member, so that the strength of the electric field in the hole or slit can be maximized.

Thus, the quantity of the conduction current is minimized so that a high electric field can be applied even with low wattage.

Although the embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The microtube liquid medium plasma discharge apparatus is applicable to a variety of fields, including: environment-related fields such as drinkable water treatment, waste water treatment, sterilization of ballast water in a vessel, agricultural water treatment, substitution of agricultural chemicals, food processing, landscaping, sterilization of a water tank, sterilization of a humidifier, cleaning of medical instruments, cleaning water treatment, a desalination system, sterilization of a fish cage, sterilization of fishbowl, removal of red/green tide, or the like; industrial fields such as unit operation, wet processes for the manufacture of a semiconductor and a flat panel display, electrolytic plating, the manufacture of chemicals; the generation of underwater shockwaves; sonar equipment (the generation of underwater sound); underwater light source; underwater jet; or the like.

The invention claimed is:

1. A liquid medium plasma discharge apparatus, comprising:

a main body filled with a liquid medium;

a power electrode provided at one side in the main body to receive electric power; and a dielectric diaphragm member provided in the main body, wherein the dielectric diaphragm member includes a dielectric and has at least one hole or slit configured to generate a plasma discharge channel therein.

2. The liquid medium plasma discharge apparatus according to claim 1, wherein the dielectric diaphragm member is disposed in contact with the power electrode.

3. The liquid medium plasma discharge apparatus according to claim 2, wherein a dielectric constant of the dielectric diaphragm member is smaller than a dielectric constant of the liquid medium.

4. The liquid medium plasma discharge apparatus according to claim 2, wherein a strength of an electric field generated in the hole or slit by the power electrode increases as a dielectric constant of the dielectric diaphragm member decreases.

5. The liquid medium plasma discharge apparatus according to claim 2, further comprising a ground electrode provided in the main body opposite the power electrode with the dielectric diaphragm member interposed therebetween, wherein the dielectric diaphragm member is disposed in contact with the ground electrode.

6. The liquid medium plasma discharge apparatus according to claim 5, wherein a dielectric constant of the dielectric diaphragm member is smaller than a dielectric constant of the liquid medium.

7. The liquid medium plasma discharge apparatus according to claim 5, wherein a strength of an electric field generated in the hole or slit by the power electrode increases as a dielectric constant of the dielectric diaphragm member decreases.

8. The liquid medium plasma discharge apparatus according to claim 1, wherein the dielectric diaphragm member is disposed at a distance from the power electrode.

9. The liquid medium plasma discharge apparatus according to claim 8, wherein a dielectric constant of the dielectric diaphragm member is smaller than a dielectric constant of the liquid medium.

10. The liquid medium plasma discharge apparatus according to claim 8, wherein a strength of an electric field generated in the hole or slit by the power electrode increases as a dielectric constant of the dielectric diaphragm member decreases.

11. The liquid medium plasma discharge apparatus according to claim 8, further comprising a ground electrode provided in the main body opposite the power electrode with the dielectric diaphragm member interposed therebetween, wherein the dielectric diaphragm member is disposed in contact with the ground electrode.

12. The liquid medium plasma discharge apparatus according to claim 11, wherein a dielectric constant of the dielectric diaphragm member is smaller than a dielectric constant of the liquid medium.

13. The liquid medium plasma discharge apparatus according to claim 11, wherein a strength of an electric field generated in the hole or slit by the power electrode increases as a dielectric constant of the dielectric diaphragm member decreases.

14. The liquid medium plasma discharge apparatus according to claim 1, wherein a dielectric constant of the dielectric diaphragm member is smaller than a dielectric constant of the liquid medium.

15. The liquid medium plasma discharge apparatus according to claim 1, wherein a strength of an electric field generated in the hole or slit by the power electrode increases as a dielectric constant of the dielectric diaphragm member decreases.

16. The liquid medium plasma discharge apparatus according to claim 1, further comprising a power supply device configured to supply to the power electrode a voltage sufficient to cause plasma discharge in the liquid medium.

17. The liquid medium plasma discharge apparatus according to claim 1, further comprising a ground electrode provided in the main body opposite the power electrode with the dielectric diaphragm member interposed therebetween, wherein the dielectric diaphragm member is disposed in contact with the ground electrode.

18. A liquid medium plasma discharge apparatus, comprising:
- a main body filled with a liquid medium;
- a power electrode provided at one side within the main body to receive electric power;
- a dielectric diaphragm member provided in the main body, the dielectric diaphragm member being composed of a dielectric having at least one hole or slit; and
- a ground electrode provided in the main body opposite the power electrode with the diaphragm member interposed therebetween, wherein the diaphragm member is disposed in contact with the ground electrode.

19. The liquid medium plasma discharge apparatus according to claim 18, wherein a dielectric constant of the dielectric diaphragm member is smaller than a dielectric constant of the liquid medium.

20. The liquid medium plasma discharge apparatus according to claim 18, wherein a strength of an electric field generated in the hole or slit by the power electrode increases as a dielectric constant of the dielectric diaphragm member decreases.

* * * * *